(12) United States Patent
Sarkar et al.

(10) Patent No.: US 10,948,926 B2
(45) Date of Patent: Mar. 16, 2021

(54) SYSTEMS AND METHODS FOR SCALABLE MULTI-VEHICLE TASK ALLOCATION

(71) Applicant: Tata Consultancy Services Limited, Mumbai (IN)

(72) Inventors: Chayan Sarkar, Kolkata (IN); Himadri Sekhar Paul, Kolkata (IN); Arindam Pal, Kolkata (IN); Arijit Mukherjee, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/022,363

(22) Filed: Jun. 28, 2018

(65) Prior Publication Data

US 2019/0212753 A1 Jul. 11, 2019

(30) Foreign Application Priority Data

Jan. 11, 2018 (IN) .............................. 201821001295

(51) Int. Cl.
*G06Q 10/08* (2012.01)
*G05D 1/02* (2020.01)
*G01C 21/20* (2006.01)
*G06F 9/48* (2006.01)
*G06Q 10/04* (2012.01)
*G06Q 50/28* (2012.01)

(52) U.S. Cl.
CPC ......... *G05D 1/0291* (2013.01); *G01C 21/206* (2013.01); *G06F 9/4881* (2013.01); *G06Q 10/047* (2013.01); *G06Q 10/08* (2013.01); *G06Q 50/28* (2013.01); *G05D 2201/0216* (2013.01)

(58) Field of Classification Search
CPC ......... G05D 1/0291; G05D 2201/0216; G01C 21/206; G06F 9/4881; G06Q 10/047; G06Q 10/08; G06Q 50/28
USPC .......................................................... 701/25
See application file for complete search history.

(56) References Cited

U.S. PATENT DOCUMENTS

| 7,788,121 B1 * | 8/2010 | Smith | G06Q 10/06 |
| | | | 705/7.26 |
| 2013/0159206 A1 * | 6/2013 | Barahona | G06Q 50/28 |
| | | | 705/338 |

(Continued)

OTHER PUBLICATIONS

Chayma Sabiri, *The Fleet Management (Capacitated Vehicle Routing Problem with Fixed Fleet of Delivery Vehicles of Uniform Capacity)*, Fleet Management Capstone Project, School of Science and Engineering—Al Akhawayn University, Spring 2017, pp. 1-46.

(Continued)

*Primary Examiner* — James M McPherson
*Assistant Examiner* — Tiffany P Ohman
(74) *Attorney, Agent, or Firm* — Finnegan, Henderson, Farabow, Garrett & Dunner, LLP

(57) ABSTRACT

Systems and methods of the present disclosure address the capacity constrained vehicle routing (CVRP) problem that may be applied to a warehouse scenario wherein multi-robot task allocation is required. Conventional methods can solve CVRP instances up to 100 nodes. In the present disclosure, a nearest-neighbor based Clustering And Routing (nCAR) approach is provided that makes the systems and methods of the present disclosure scalable wherein the number of nodes can be in the range of several hundreds to several thousands within an order wave.

6 Claims, 9 Drawing Sheets

(56) References Cited

U.S. PATENT DOCUMENTS

| | | | | |
|---|---|---|---|---|
| 2018/0075402 A1* | 3/2018 | Stadie | .................. | B65G 1/1378 |
| 2018/0315319 A1* | 11/2018 | Spector | .................. | G08G 1/202 |
| 2018/0359904 A1* | 12/2018 | Foster | .................. | A01B 69/008 |
| 2019/0228375 A1* | 7/2019 | Laury | ................ | G06Q 10/0836 |
| 2019/0251485 A1* | 8/2019 | Looman | ............. | G01C 21/3632 |

OTHER PUBLICATIONS

Anna Yershova, et al., "Improving Motion Planning Algorithms by Efficient Nearest-Neighbor Searching," *IEEE Transactions on Robotics / Short Paper*, Feb. 2017, pp. 1-8.

Klaas Klasing, et al., "Realtime Segmentation of Range Data Using Continuous Nearest Neighbors," Institute of Automatic Control Engineering Technische Universitat Munchen, Munich, Germany, May 2009, pp. 1-6.

Thomas Chabot, et al., "Order Picking Problems under Weight, Fragility and Category Constraints," Cirrelt Interuniversity Research Centre on Enterprise Networks, Sep. 2015, pp. 1-35.

\* cited by examiner

SYSTEMS AND METHODS FOR SCALABLE MULTI-VEHICLE TASK ALLOCATION

PRIORITY CLAIM

This U.S. patent application claims priority under 35 U.S.C. § 119 to: Indian Patent Application No. 201821001295, filed on 11 Jan. 2018. The entire contents of the aforementioned application are incorporated herein by reference.

TECHNICAL FIELD

The disclosure herein generally relates to a capacity constrained vehicle routing problem (CVRP), and more particularly relates to systems and methods for scalable multi-vehicle task allocation.

BACKGROUND

In modern warehouses, robots are generally employed along with humans to perform tasks that are less productive and unsafe for humans. For instance, the tasks may involve robots fetching outgoing objects from their respective storage racks and bringing them to the packaging dock. This requires a careful task allocation along with route planning such that the total path traveled (cost) by all the robots to complete all the tasks is minimized. The number of tasks that can be performed in a single run (part of the same route) depends on the maximum capacity of the robot and the combined weight of the objects on that route. This task allocation problem may be mapped to the capacity-constrained vehicle routing problem (CVRP), which is a non-deterministic polynomial time (NP) hard problem. Though there exists a number of methods that provide a near-optimal solution to the CVRP instance, they do not scale well with the number of nodes (tasks).

SUMMARY

Embodiments of the present disclosure present technological improvements as solutions to one or more of the above-mentioned technical problems recognized by the inventors in conventional systems.

In an aspect, there is provided a processor implemented method comprising: obtaining input parameters comprising number of nodes representative of tasks to be allocated to one or more vehicles, distance between the nodes, demand associated with each of the nodes and maximum capacity of each of the one or more vehicles; determining a plurality of clusters of the nodes based on a nearest neighbor based Clustering and Routing (nCAR) approach such that each of the plurality of clusters forms a feasible route for an associated vehicle, wherein a total demand associated with each of the plurality of clusters is within the maximum capacity of the associated vehicle; and the plurality of clusters lead to a lowest total cost, wherein the total cost is representative of a total length travelled by the one or more vehicles to complete all the tasks; and determining an optimum route within each of the plurality of clusters using a traveling salesman problem (TSP) approach.

In another aspect, there is provided a system comprising: one or more data storage devices operatively coupled to the one or more processors and configured to store instructions configured for execution by the one or more processors to: obtain input parameters comprising number of nodes representative of tasks to be allocated to one or more vehicles, distance between the nodes, demand associated with each of the nodes and maximum capacity of each of the one or more vehicles; determine a plurality of clusters of the nodes based on a nearest neighbor based Clustering and Routing (nCAR) approach such that each of the plurality of clusters forms a feasible route for an associated vehicle, wherein a total demand associated with each of the plurality of clusters is within the maximum capacity of the associated vehicle; and the plurality of clusters lead to a lowest total cost, wherein the total cost is representative of a total length travelled by the one or more vehicles to complete all the tasks; and determine an optimum route within each of the plurality of clusters using a traveling salesman problem (TSP) approach.

In yet another aspect, there is provided a computer program product comprising a non-transitory computer readable medium having a computer readable program embodied therein, wherein the computer readable program, when executed on a computing device, causes the computing device to: obtain input parameters comprising number of nodes representative of tasks to be allocated to one or more vehicles, distance between the nodes, demand associated with each of the nodes and maximum capacity of each of the one or more vehicles; determine a plurality of clusters of the nodes based on nearest neighbor based Clustering and Routing (nCAR) approach such that each of the plurality of clusters forms a feasible route for an associated vehicle, wherein a total demand associated with each of the plurality of clusters is within the maximum capacity of the associated vehicle; and the plurality of clusters lead to a lowest total cost, wherein the total cost is representative of a total length travelled by the one or more vehicles to complete all the tasks; and determine an optimum route within each of the plurality of clusters using a traveling salesman problem (TSP) approach.

In an embodiment of the present disclosure, the one or more hardware processors are further configured to determine a plurality of clusters of the nodes based on the nCAR approach by: (i) creating n potential clusters for n number of the nodes, the nodes being initially unassigned to any cluster, the step of creating n potential clusters comprises iteratively performing for each node: initializing demand of an $i^{th}$ potential cluster to the demand of an $i^{th}$ node; identifying the $i^{th}$ node as a current node; iteratively determining a nearest neighbor of the current node based on Euclidean distance therebetween; selecting the nearest neighbor as a cluster member and identifying the nearest neighbor as a new current node if a capacity restriction is satisfied, wherein sum of the demand of the $i^{th}$ potential cluster and the demand of the nearest node representing the total demand is within the maximum capacity of the associated vehicle to form the feasible route; and (ii) selecting a best cluster from the n potential clusters by: computing Euler cycle cost and single node cycle cost associated with nodes of the n potential clusters and assigning summation thereof as total cost for each of the n potential clusters; selecting the potential cluster associated with a lowest total cost as the best cluster; and assigning the nodes of the best cluster to a group T and remaining nodes of the n number of nodes to a group T̄; (iii) repeating steps (i) and (ii) until the group T̄ is empty; wherein the best cluster from each iteration constitutes the plurality of clusters that form the feasible route for the associated vehicle.

In an embodiment of the present disclosure, the plurality of clusters comprises disjoint sets of the nodes except for a depot node representative of a node where a cluster starts and ends.

In an embodiment of the present disclosure, number of clusters comprising the plurality of clusters determines number of vehicles required to complete all the tasks.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Before setting forth the detailed explanation, it is noted that all of the discussion below, regardless of the particular implementation being described, is exemplary in nature, rather than limiting.

In general, automation using a group of mobile robots constitutes two major steps viz., task allocation and task execution. The goal of task allocation is to ensure that the overall cost of executing all the tasks is minimized, while redundant robot resources are not allocated to complete a task. On the other hand, task execution ensures that the tasks are executed correctly and safely according to the assignment. The present disclosure focuses on task allocation.

Figure 1:
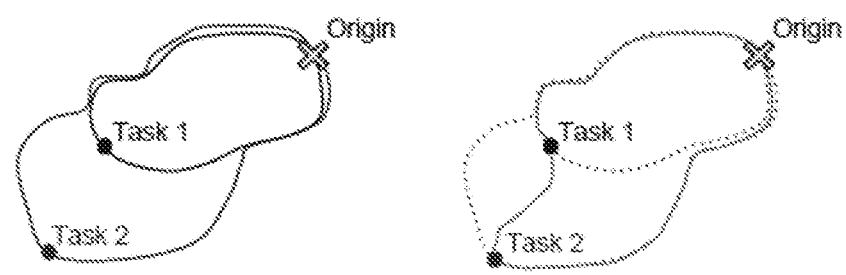
FIG. 1 illustrates a schematic representation of a single task completion on a single run (ST-SR) versus more than one task completion on a single run (MT-SR) as known in the art.

In a warehouse scenario, the task of a robot is defined as moving to a location of a particular object, fetching the object from a storage rack, and returning to the original location (packaging dock). Though a robot almost never fetches multiple objects from the racks simultaneously, it can fetch more than one object on a single run, before returning back to the dock. This reduces the overall travel time as compared to fetching one object on a single run. FIG. 1 illustrates a schematic representation of a single task completion on a single run (ST-SR) versus more than one task (multiple tasks) completion on a single run (MT-SR) as known in the art. Obviously, the total time required to fetch all the required objects is smaller in the case of MT-SR if the objects in close proximity are fetched on a single run. The ST-SR is a special constrained version of the MT-SR problem. The associated problem in MT-SR case is to group tasks, optimally, to be given to a robot, given that each of the robots has a certain (fixed) carrying capacity.

The present disclosure is directed to a multi robot task allocation problem that is reduced to a capacity constrained vehicle routing (CVRP) problem, where each robot is constrained by its maximum weight carrying capacity. The intent is to assign tasks to the robots such that overall time to bring the items to the packing dock can be minimized. Since CVRP is a known nondeterministic polynomial time (NP) hard problem, Conventional exact and heuristic methods for CVRP do not scale well with the number of nodes (tasks). In applications like the warehouse scenario, the number of nodes may be large and vary significantly (from couple of hundreds to thousands) as opposed to smaller number of nodes in typical CVRP instances (generally up to a hundred). Thus, the prevalent methods become impractical.

In the context of the present disclosure, the expressions 'vehicle' and 'robot' may be used interchangeably. Although further description of the present disclosure is directed to a warehouse scenario, it may be noted that the described application is non-limiting and systems and methods of the present disclosure may be applied in any domain, where the CVRP instances particularly involve a large number of tasks (nodes) to be allocated such as courier service, car pool service, product delivery service, and the like.

In a warehouse, an item is scheduled to be dispatched when a customer places an order for it. Usually a warehouse is spread across a very large area, and items are also stored in racks across a vast field. The task for a robot is to fetch the items from storage racks to the packaging dock. In the present disclosure, it is assumed that the robots are homogeneous and each one has a fixed maximum weight carrying capacity. It is also assumed that the tasks are homogeneous in nature, but they differ based on the storage location and weight of the item. In general, tasks are handled as a wave, where a wave contains couple hundreds to thousands tasks. Once the tasks are completed, the next wave, which accumulates during the execution of the previous wave, is picked for execution.

The present disclosure provides a heuristic method such that the cost of fetching all the ordered items may be minimized. In the context of the present disclosure, the cost refers to the total path length traveled by all the robots to complete all the tasks. A robot always starts from and comes back to the packaging dock of the warehouse. On a single run, a robot can fetch multiple items, i.e., completing multiple tasks, provided the total demand (weight) of all the tasks is within the capacity of the robot. Thus, it can be classified as a multi-task robot and single-robot task (MT-SR) assignment problem, wherein one robot performs multiple tasks simultaneously and to complete a task one robot is needed.

The problem can be reduced to the classical CVRP problem, where a number of vehicles start and end their journey at a depot. On their journey, they service a number of customers, where the total demand of all the customers on a single journey must be within the capacity limit of the robots. The goal is to find an optimal route for each of the robots such that the total cost of the all the journeys made by the fleet of robots is minimized and all the customers are serviced by exactly one robot. As CVRP is known to be NP hard, the MT-SR assignment problem is also an NP-hard problem.

The mathematical formulation of the technical problem may be presented as given hereinafter. Let G=(V, E) be an undirected, complete graph. The number of vertices in the graph is |V|=n+1. The vertices may be denoted as V={$v_0$, $v_1$, ..., $v_n$}, wherein vertex $v_0$ corresponds to the depot and other vertices V'=V\{$v_0$} correspond to n sites. Let $V_i$={$v_i$, 0≤i≤n}. The number of vertices may be denoted as E, wherein each e∈E has a cost $c_e$>0. This is the cost of traveling the edge e. For each vertex $v_i$∈V', there is an associated demand $d_i$>0, which has to be satisfied. Let k be the number of robots available at the depot and let C be the capacity of each robot. Without loss of generality, it is assumed that the maximum demand of any vertex is at most the capacity of each robot, i.e., $d_i$<C, for all $v_i$∈V'.

The goal is to find a set of vertex-disjoint cycles (except at the depot) such that the total cost of the cycles is minimized and the total demand of all the vertices in each cycle does not exceed the capacity of any robot. Mathematically, the goal is to find t cycles $Cycle_1$, ..., $Cycle_t$ such that:

$$\Sigma_{i=1}^{t} = c(Cycle_i) \text{ is minimized.} \quad 1)$$

$$Cycle_i \cap Cycle_j = \{v_0\}, \text{ for } 1 \leq i < j \leq t. \quad 2)$$

$$\Sigma_{v_j \in C_i} d_j \leq C, \text{ for } 1 \leq i \leq t. \quad 3)$$

The cost of a cycle Cycle is c(Cycle)=$\Sigma_{v \in C} c(v)$

Given the maximum capacity of the vehicles (C) and a set of nodes (N), with their location and demand specified, a heuristic nearest neighbor based Clustering and Routing (nCAR) method, in accordance with the present disclosure, provides the number of vehicles required to visit all the nodes ($v_{count}$). Additionally, it provides the route of each vehicle as a sequence of nodes ($R_{list}$) and the total cost to travel all the routes ($c_{total}$). The nodes are representative of tasks to be allocated; the demand is representative of weight/quantity/count associated with the tasks and maximum capacity is representative of the weight carrying capacity of the vehicle. The objective of the nCAR method, in accordance with the present disclosure, is to minimize the total path cost while finding the list of routes, where every route fulfills the capacity constraints of all the vehicles, and so can be assigned to the vehicles. The heuristic nCAR splits all nodes (tasks) into a number of clusters, where clusters contain disjoint set of nodes except the depot. Then a route is constructed for each of the clusters by mapping it to a traveling salesman problem (TSP). Given a set of nodes T, TSP(T) returns a Hamiltonian cycle(route) R and it's cost c. In an embodiment, nCAR uses a method for TSP by Christofides, whose approximation ratio is 1.5. The criteria to create a cluster is two-fold: firstly, the nodes within a cluster should form a feasible route, i.e., the total demand of all the cluster members are within the capacity constraint (C) of the vehicles; and the clusters should be formed in such a way that the path cost of individual clusters lead to a lower total path cost.

Referring now to the drawings, and more particularly to FIGS. 2 through 9, where similar reference characters denote corresponding features consistently throughout the figures, there are shown preferred embodiments and these embodiments are described in the context of the following exemplary system and method.

Figure 2:
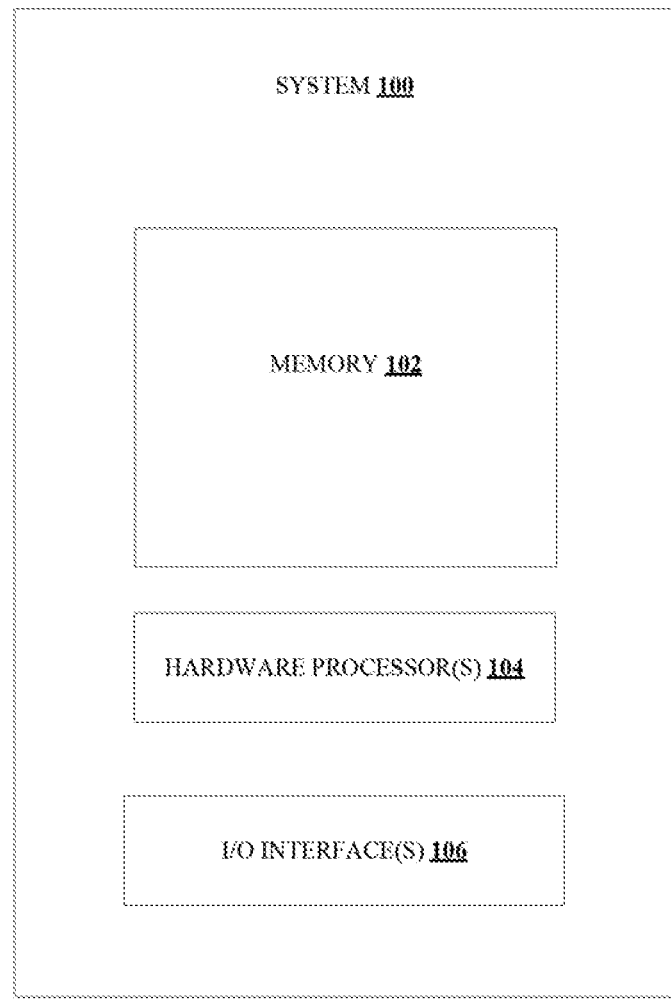
FIG. 2 illustrates an exemplary block diagram of a system for scalable multi-vehicle task allocation, in accordance with an embodiment of the present disclosure.

FIG. 2 illustrates an exemplary block diagram of a system 100 for scalable multi-vehicle task allocation, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

In an embodiment, the system 100 includes one or more data storage devices or memory 102 operatively coupled to the one or more processors 104 and is configured to store instructions configured for execution of steps of the method 200 by the one or more processors 104.

Figure 3:
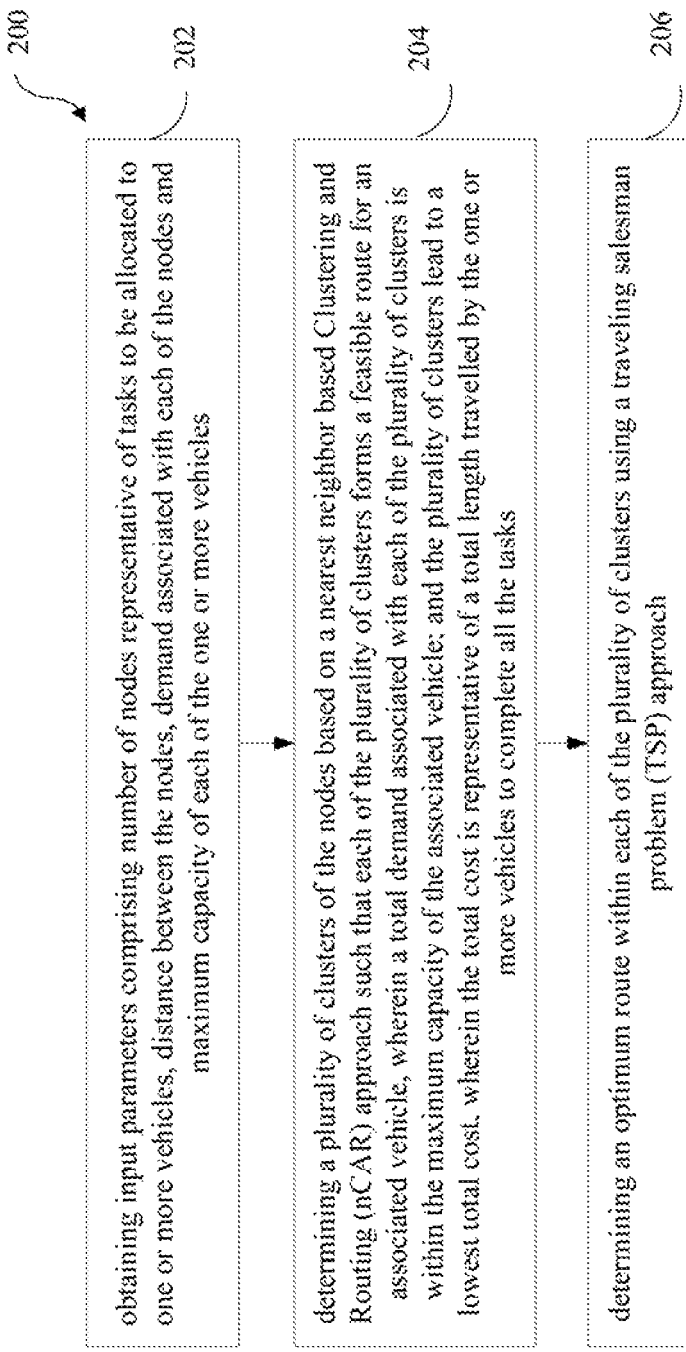
FIG. 3 is an exemplary flow diagram illustrating a computer implemented method for scalable multi-vehicle task allocation, in accordance with an embodiment of the present disclosure.

FIG. 3 is an exemplary flow diagram illustrating a computer implemented method for scalable multi-vehicle task allocation, in accordance with an embodiment of the present disclosure. The steps of the method 200 will now be explained in detail with reference to the components of the system 100 of FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Accordingly, in an embodiment of the present disclosure, the one or more processors 104 are configured to obtain, at step 202, input parameters comprising number of nodes representative of tasks to be allocated to one or more vehicles, distance between the nodes, demand associated with each of the nodes and maximum capacity of each of the one or more vehicles. In an embodiment, the input parameters may comprise location of the nodes and the one or more processors 104 may be configured to compute distance between the nodes. In the context of the present disclosure, the distance is a metric that satisfies triangle inequality.

Initially, all the nodes are unassigned, i.e. not part of any cluster or route. Iteratively, a cluster (feasible route) is to be determined until all the nodes are assigned to a cluster. In each iteration, the yet to be assigned (to a cluster) nodes are split into two parts—a cluster of nodes that can form a feasible route belong to a group T and remaining nodes belong to a group $\overline{T}$ using a function feasibleRoute. The iteration continues until the group $\overline{T}$ is empty. Accordingly, in an embodiment of the present disclosure, the one or more processors 104 are configured to determine, at step 204, a plurality of clusters of the nodes based on the nCAR approach such that each of the plurality of clusters forms a feasible route for an associated vehicle, wherein a total demand associated with each of the plurality of clusters is within the maximum capacity of the associated vehicle; and the plurality of clusters lead to a lowest total cost, wherein the total cost is representative of a total length travelled by the one or more vehicles to complete all the tasks.

The nearest neighbor based Clustering and Routing (nCAR) method may be represented as given below.

Input: A graph G = (V, E), demands of each vertex ($d_i$), and the capacity of the vehicles (C).
Output: The required number of vehicles ($v_{count}$), the list of routes ($R_{list}$), and the total cost of all the routes ($c_{total}$).

| | |
|---|---|
| 1 | Algorithm nCAR(V, C) |
| 2 | N ← V; |
| 3 | $v_{count}$ ← 0; |
| 4 | $c_{total}$ ← 0; |
| 5 | $R_{list}$ ← {}; |
| 6 | while (!N.empty()) do |
| 7 | [T, $\overline{T}$] ← feasibleRoute (N,C); |
| 8 | [R, c] ← TSP(T); |
| 9 | $R_{list}$ ← $R_{list}$ ∪ R; |
| 10 | $v_{count}$ ← $v_{count}$ + 1; |
| 11 | $c_{total}$ ← $c_{total}$ + c; |
| 12 | N ← $\overline{T}$; |
| 13 | return [$R_{list}$, $v_{count}$, $c_{total}$]; |
| 1 | Procedure feasibleRoute (N,C) |
| 2 | $p_{min}$ ← singleNodeCycle (N); |
| 3 | for (i=1:|N|) do |

-continued

Input: A graph G = (V, E), demands of each vertex ($d_i$), and the capacity of the vehicles (C).
Output: The required number of vehicles ($v_{count}$), the list of routes ($R_{list}$), and the total cost of all the routes ($c_{total}$).

| | |
|---|---|
| 4 | $N_T$ ← {N[0], N[i]}; |
| 5 | $\underline{N}_T$ ← N \ {N[i]}; |
| 6 | $d_T$ ← N[i].d; |
| 7 | k ← i; |
| 8 | while ($d_T$ < C) do |
| 9 | k ← restrictedNearestNeighbor (k, $\underline{N}_T$, $d_T$); |
| 10 | if (k = 0) then |
| 11 | break |
| 12 | $d_T$ ← $d_T$ + $\underline{N}_T$[k].d; |
| 13 | $N_T$ ← $N_T$ ∪ $\underline{N}_T$[k]; |
| 14 | $\underline{N}_T$ ← $\underline{N}_T$ \ $\underline{N}_T$[k]; |
| 15 | p ← eulerCycle ($N_T$) + singleNodeCycle ($\underline{N}_T$); |
| 16 | if (p < $p_{min}$) then |
| 17 | $p_{min}$ ← p; |
| 18 | $T_{min}$ ← $N_T$; |
| 19 | $\underline{T}_{min}$ ← $\underline{N}_T$; |
| 20 | return [$T_{min}$, $\underline{T}_{min}$]; |

In an embodiment of the present disclosure, the nCAR method comprises firstly creating n potential clusters for n number of the nodes, wherein the n nodes are initially unassigned to any cluster. A trivial approach to find the optimal solution of CVRP is to explore all possible cluster combinations and choose the combination that provides a minimum (overall) cost. But this is not a feasible solution as there are exponentially many combinations. nCAR is a restricted nearest neighbor approach that creates a subset of the possible cluster combination that most likely results in a low cost solution. The subset comprises a plurality of clusters of disjoint sets of nodes except for the depot representative of a node where the cluster starts and ends. Since all possible cluster combinations are not explored, the nCAR method is a more scalable method. In accordance with the present disclosure, creating the n potential clusters involves firstly initializing demand of an $i^{th}$ potential cluster to the demand of an $i^{th}$ node. The $i^{th}$ node is then identified as a current node. A nearest neighbor of the current node is iteratively determined based on Euclidean distance between a nearest neighbor under consideration and the current node. The nearest neighbor under consideration is selected as a cluster member if a capacity restriction is satisfied. Sum of the demand of the $i^{th}$ potential cluster and the demand of the nearest node represents the total demand. If the total demand is within the maximum capacity of the associated vehicle, it implies the capacity restriction is satisfied and the nearest neighbor under consideration is selected as a cluster member to form the feasible route. The nearest neighbor under consideration is then identified as the current node.

Once all the nodes are assigned to a cluster, a best cluster is selected from the n potential clusters such that the total path cost of all the routes can be minimized. In accordance with the present disclosure, a greedy approach is adopted wherein firstly Euler cycle cost and single node cycle cost associated with the nodes of the n potential clusters are computed. The summation of the two costs is assigned as total cost for each of the n potential clusters. A potential cluster out of the n potential clusters having a lowest total cost is then selected as the best cluster. The nodes of the best cluster are then assigned to the group T and remaining nodes of the n number of nodes are assigned to the group $\overline{T}$. The steps of creating potential clusters and selecting the best cluster are repeated until the group $\overline{T}$ is empty. The best cluster from each iteration constitutes the plurality of clusters that form the feasible route for the associated vehicle In an embodiment of the present disclosure, the one or more processors 104 are configured to determine, at step 206, an optimum route within each of the plurality of clusters using a traveling salesman problem (TSP) approach.

A simplistic representation of the nCAR method of the present disclosure may be provided by means of an example as under.
Say n=5 nodes,
demand for node 1=1, node 2=2, node 3=3, node 4=4 and node 5=5, and
capacity of the vehicle=7
For =5, 5 clusters are created in accordance with the step 204.
To create the 5 clusters:
Start with node 1 and find the nearest neighbor(s) satisfying the capacity restriction and create cluster 1.
Start with node 2 and find the nearest neighbor(s) satisfying the capacity restriction and create cluster 2.
Start with node 3 and find the nearest neighbor(s) satisfying the capacity restriction and create cluster 3.
Start with node 4 and find the nearest neighbor(s) satisfying the capacity restriction and create cluster 4.
Start with node 5 and find the nearest neighbor(s) satisfying the capacity restriction and create cluster 5.
The 5 clusters thus obtained are not disjoint.
In accordance with the present disclosure, the total cost (Euler cycle cost+single node cycle cost) is computed for each of the 5 clusters.
The cluster having the lowest total cost is selected as the best cluster.
Say cluster 1 has the lowest total cost and comprises nodes (1, 4) that are assigned to the group T. The remaining nodes (2, 3, 5) are then assigned to the group $\overline{T}$.
In the second iteration, the nodes (2, 3, 5) from the group $\overline{T}$ are considered and 3 clusters are formed starting with node 2 followed by node 3 and node 5. The total cost is computed for the three clusters and the cluster associated with the lowest cost is then selected as the best cluster and the associated nodes are assigned to the group T and the remaining nodes are assigned to the group $\overline{T}$. The steps of creating clusters and selecting the best cluster continue until the group $\overline{T}$ is empty. In accordance with the present disclosure, for each of the best clusters, an optimum route is determined using the TSP approach in accordance with the step 206. For instance, if a best cluster includes nodes (2, 3, 5), out of the possible routes, the TSP approach determines an optimum route within the cluster, say, (3, 2, 5).

In accordance with the present disclosure, number of clusters comprising the plurality of clusters determines number of vehicles required to complete all the tasks.

Time-complexity analysis: Consider the procedure feasibleRoute provided above as part of the nCAR method which constructs one feasible route. Both the sets $N_T$ and $\overline{N_T}$ are constructed from the vertex set V (lines 4, 5, 13 and 14). Hence $|N_T|<n$ and $|\overline{N_T}|<n$, where n=|V|. The value of $d_T$ monotonically increases within the while loop at line 8. The incremental value is computed at line 12 and the value is the cost of one of the nodes from the set $\overline{N_T}$. The chosen $k^{th}$ node is removed from $\overline{N_T}$. This while loop is terminated when, either $d_T$ exceeds the capacity C, or all feasible nodes in $\overline{N_T}$ are exhausted. In either case, the while loop is executed at most $\{C, |\overline{N_T}|\}<n$ times. Therefore, the cost of this while loop is O(n).

The procedure eulerCycle is based on the linear-time depth-first search (DFS) of the nodes in V. So its running time is O(n). Both the call to procedure eulerCycle and the while loop at line 8 are contained in a for loop at line 3. This outer for loop is bounded by |N|, i.e. the complexity of this loop is O(n). Therefore, the complexity of the function feasibleRoute as a whole is $O(n\times(O(n)+O(n)))=O(n^2)$.

Consider the main function nCAR, where the function feasibleRoute returns one non-empty route on each invocation, i.e., until T≠0. The set N is initialized as V and T is removed from N on line 12 at each iteration of the while loop (line 6). Therefore, the set N monotonically shrinks in size. This implies that the while loop at line 6 is executed at most |V| times, which is O(n). Since feasibleRoute is of $O(n^2)$, running time of Ncar is $O(n\times n^2)=O(n^3)$.

Evaluation: The performance of the nCAR method of the present disclosure is evaluated from three aspects—(i) cost of the solution, (ii) number of routes in the solution and (iii) execution time of the method. The cost of the solution is measured as the total distance travelled by all the vehicles to visit all the nodes. Since a single vehicle would not be able to visit all the nodes in one go (due to capacity constraint), the solution comprises of a number of routes, where a route comprises of a sequence of nodes. If there are as many vehicles available as the number of routes in the solution, all the routes can be traversed in parallel by different vehicles. However, if the number of vehicles is less than the number of routes, the assignment becomes time-extended and a vehicle starts a new route after completing the previously assigned route. Whether each route is traversed by a different vehicle or a vehicle traverses multiple routes, the cost of the solution remains unchanged. Also, the sequence of traversing the routes does not have any effect on the solution cost. The third performance metric is the absolute running time (in milliseconds) of the method on a standard computer (Intel™ 5th generation processor with dual core and 4 GB memory).

Comparison of nCAR with the Optimal solution: The performance of nCAR is evaluated for some well-known instances of CVRP (benchmarks) whose optimal solutions are known. Firstly, presented are the results for the P-dataset of the Capacitated Vehicle Routing Problem Library (CVR-PLIB) provided by Augerat et al. Table I below summarizes the cost and the number of routes for these CVRP instances that are solved optimally, the state-of-the art Google™ optimization tools (OR-Tools) and the nCAR method of the present disclosure.

TABLE I

Performance comparison among the Optimal, Google ™ OR-Tools, and nCAR method based on a P-dataset Of CVRPLIB.

| dataset | Optimal | | OR-Tools | | nCAR | |
|---|---|---|---|---|---|---|
| | cost | routes | cost | routes | cost | routes |
| P-n16-k8 | 450 | 8 | 450 | 8 | 450 | 8 |
| P-n19-k2 | 212 | 2 | 230 | 2 | 247 | 2 |
| P-n20-k2 | 216 | 2 | 227 | 2 | 247 | 2 |
| P-n21-k2 | 211 | 2 | 211 | 2 | 254 | 2 |
| P-n22-k2 | 216 | 2 | 220 | 2 | 278 | 2 |
| P-n22-k8 | 603 | 8 | 595 | 9 | 797 | 8 |
| P-n23-k8 | 529 | 8 | 538 | 9 | 605 | 10 |
| P-n40-k5 | 458 | 5 | 459 | 5 | 670 | 5 |
| P-n45-k5 | 510 | 5 | 543 | 5 | 719 | 5 |
| P-n50-k7 | 554 | 7 | 575 | 7 | 781 | 7 |
| P-n50-k8 | 631 | 8 | 681 | 9 | 750 | 9 |
| P-n50-k10 | 696 | 10 | 778 | 10 | 868 | 10 |
| P-n51-k10 | 741 | 10 | 838 | 10 | 1014 | 11 |

TABLE I-continued

Performance comparison among the Optimal, Google™ OR-Tools, and nCAR method based on a P-dataset Of CVRPLIB.

| dataset | Optimal | | OR-Tools | | nCAR | |
| --- | --- | --- | --- | --- | --- | --- |
| | cost | routes | cost | routes | cost | routes |
| P-n55-k7 | 568 | 7 | 579 | 7 | 772 | 7 |
| P-n55-k8 | 588 | 8 | 627 | 7 | 759759 | 7 |
| P-n55-k10 | 694 | 10 | 735 | 10 | 1044 | 10 |
| P-n55-k15 | 989 | 15 | 977 | 16 | 1156 | 16 |
| P-n60-k10 | 744 | 10 | 844 | 10 | 877 | 10 |
| P-n60-k15 | 968 | 15 | 1025 | 15 | 1149 | 15 |
| P-n65-k10 | 792 | 10 | 875 | 10 | 1080 | 10 |
| P-n70-k10 | 827 | 10 | 923 | 10 | 1021 | 10 |
| P-n76-k4 | 593 | 4 | 678 | 4 | 745 | 4 |
| P-n76-k5 | 627 | 5 | 712 | 5 | 798 | 5 |
| P-n101-k4 | 681 | 4 | 793 | 4 | 980 | 4 |

Figure 4:
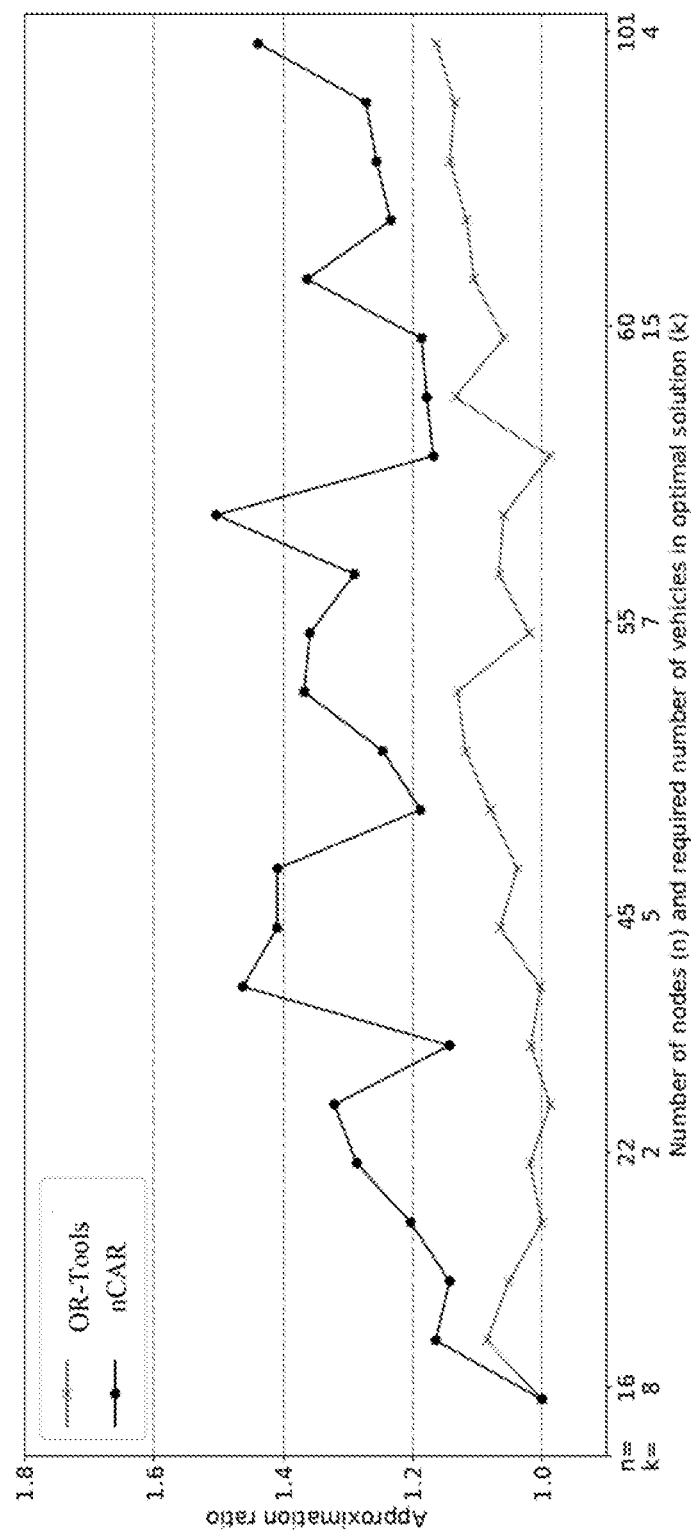
FIG. 4 provides a graphical representation of cost ratio of Google™ optimization tools (OR-Tools) and the method of the present disclosure using P-dataset of the Capacitated Vehicle Routing Problem Library (CVRPLIB).

Solutions provided by both OR-Tools and nCAR are close to the optimal solutions, as evident from Table I. FIG. 4 provides a graphical representation of cost ratio of Google™ optimization tools (OR-Tools) and the method of the present disclosure using P-dataset of the Capacitated Vehicle Routing Problem Library (CVRPLIB), wherein cost ratio is defined as, $$\text{cost ratio} = \frac{\text{cost of the heuristic method}}{\text{cost of the optimal method}}$$

Some of the exceptional cases are highlighted in Table I viz., P-n22-k8 and P-n55-k8 where the cost ratio of OR-Tools is less than 1. OR-Tools produce lower cost solution (bold) than the optimal solution which is impossible in theory and the Optimal solution have more routes (underlined). These discrepancies are mainly due to floating point rounding-off of the Euclidean distances. However, for the instance P-n22-k8, the OR-Tools always provide a low cost solution. Though the optimal solution requires fewer routes, the cost of the solution is higher which is the only optimization goal without any restriction on the required number of routes. This invalidates the optimal solution for this particular instance.

Though the required number of vehicles for all the three methods are almost the same for most of the instances, the optimal solution often comprises lesser number of routes. However, there is one instance (P-n55-k8) where the optimal solution comprises more routes as compared to the other two methods. As the goal of the method is to minimize the total cost, this situation is definitely possible since the cost of the optimal solution is lower than the other two. Even though OR-Tools often has a much lower cost ratio as compared to nCAR, it requires much higher computation time as evident from FIG. 5 that provides a graphical representation of the execution time of Google™ optimization tools (OR-Tools) and the method of the present disclosure using P-dataset of the Capacitated Vehicle Routing Problem Library (CVRPLIB). This holds true across the dataset. For example, a similar result is shown in FIG. 6 that provides a graphical representation of the execution time of Google™ optimization tools (OR-Tools) and the method of the present disclosure using X-dataset provided by Uchoa et al. that consists of 100 to 1000 nodes.

Performance of nCAR for large number of nodes: As the given MT-SR assignment problem (warehouse scenario) needs to be solved when there is relatively large number of nodes (of the order of hundreds and thousands), the performance of nCAR is also analyzed for such large instances. As the optimal solutions for such instances cannot be produced in a reasonable time, nCAR is compared with the solutions produced by OR-tools only. Though the OR-Tools produces a low cost solution as compared to nCAR for the majority of the CVRP instances of small number of nodes, nCAR surpasses OR-Tools with respect to all the three parameters when CVRP instances of large number of nodes are used. Thus, in a warehouse scenario where the CVRP instances contain a large number of nodes, nCAR is a much better option.

Figure 5:
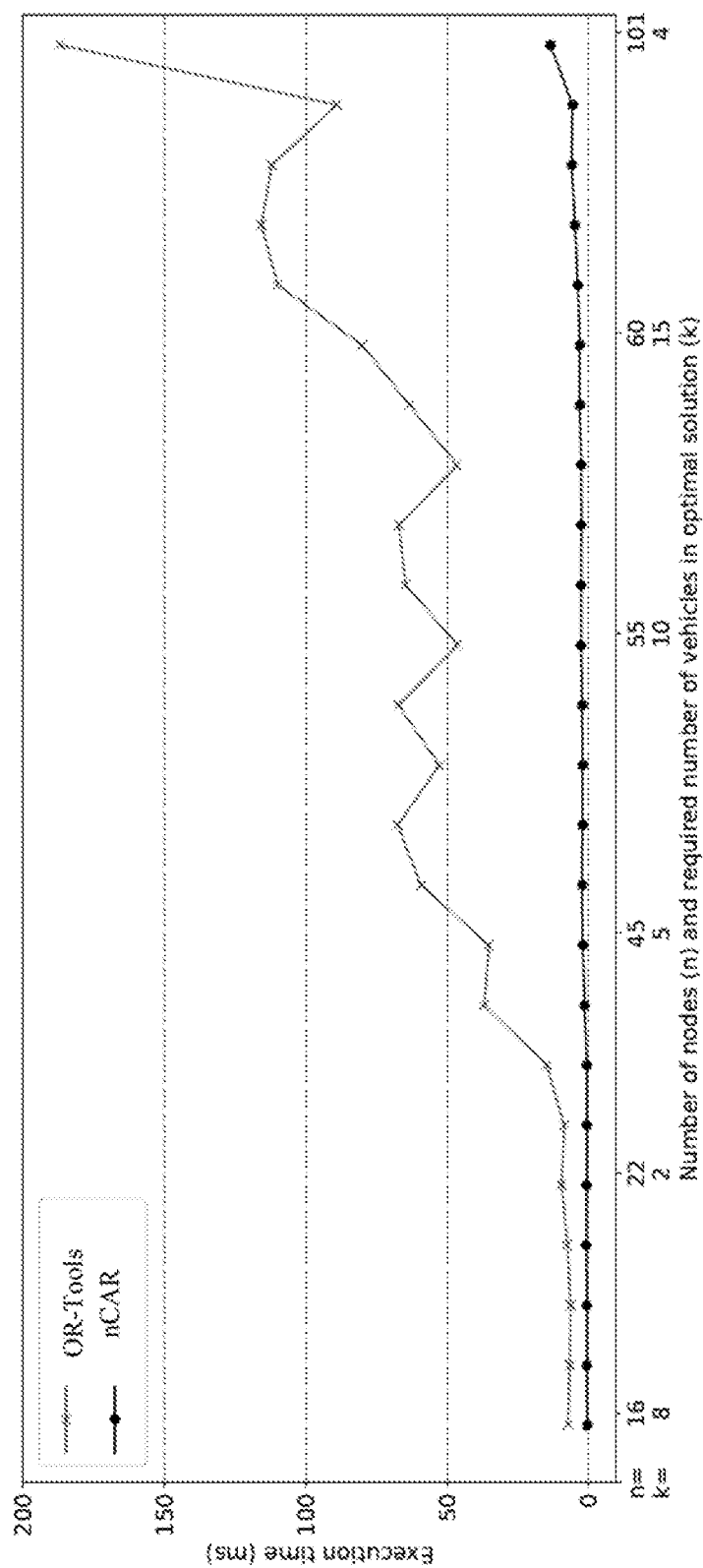
FIG. 5 provides a graphical representation of the execution time of Google™ optimization tools (OR-Tools) and the method of the present disclosure using P-dataset of the Capacitated Vehicle Routing Problem Library (CVRPLIB).
Figure 6:
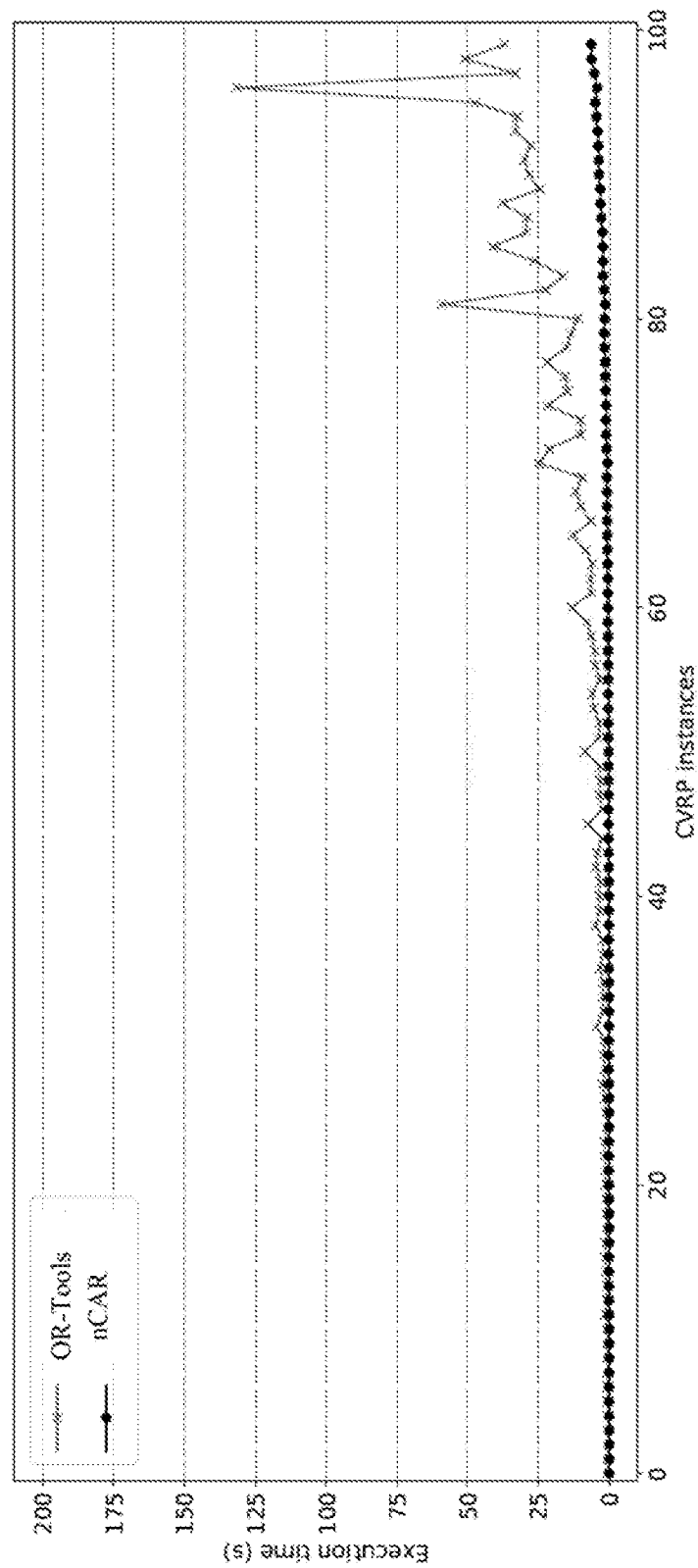
FIG. 6 provides a graphical representation of the execution time of Google™ optimization tools (OR-Tools) and the method of the present disclosure using X-dataset provided by Uchoa et al.
Figure 7:
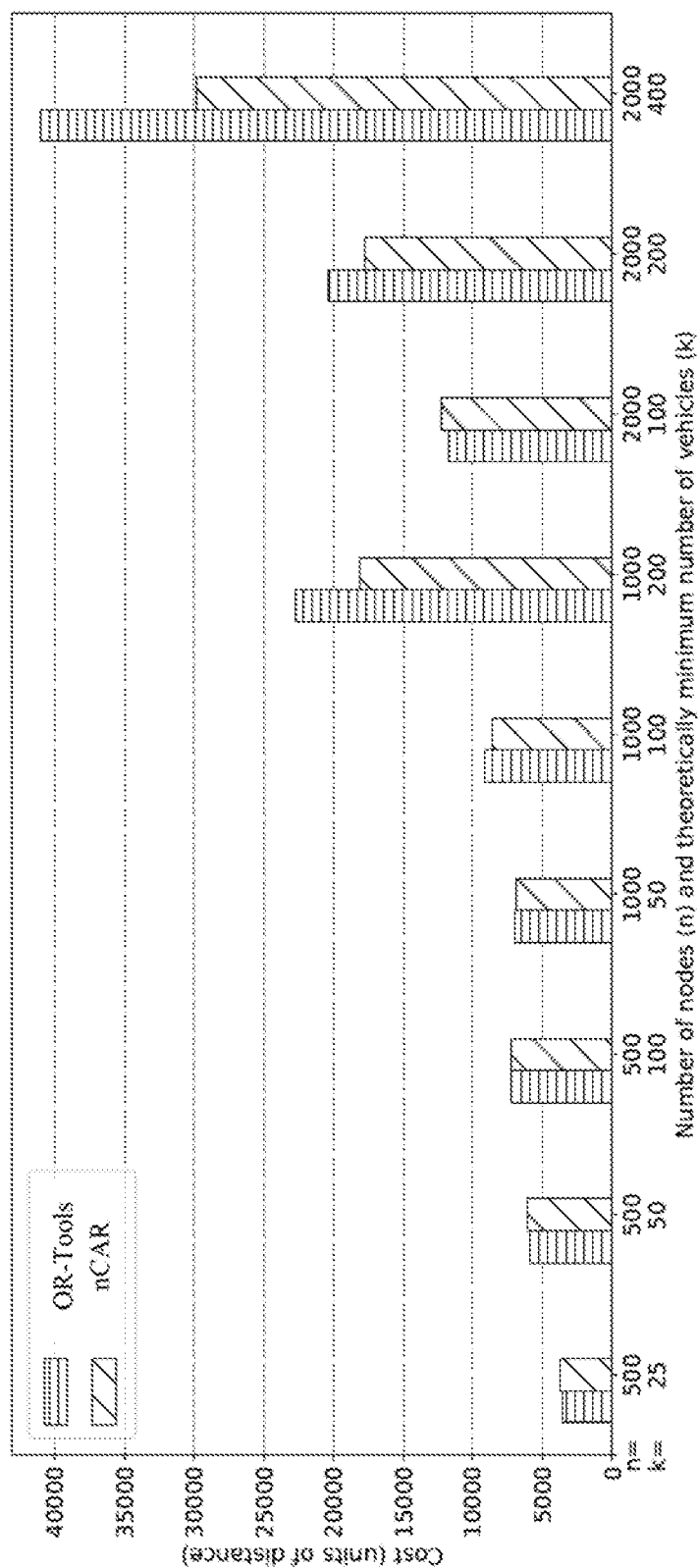
FIG. 7 provides a cost comparison between Google™ optimization tools (OR-Tools) and the method of the present disclosure for a large number of nodes.

FIG. 5, FIG. 6, and FIG. 7 compare nCAR with OR-Tools with respect to the cost of the solution, execution time to find the solution, and the number of routes in the solution, respectively. The CVRP instances contain three different number of nodes, i.e., 500, 1000, and 2000. For each of these node sets, the minimum number of routes (theoretical) is varied based on the demand of each vehicle and capacity of each vehicle. Thus, there are a total of nine CVRP instances.

Figure 8:
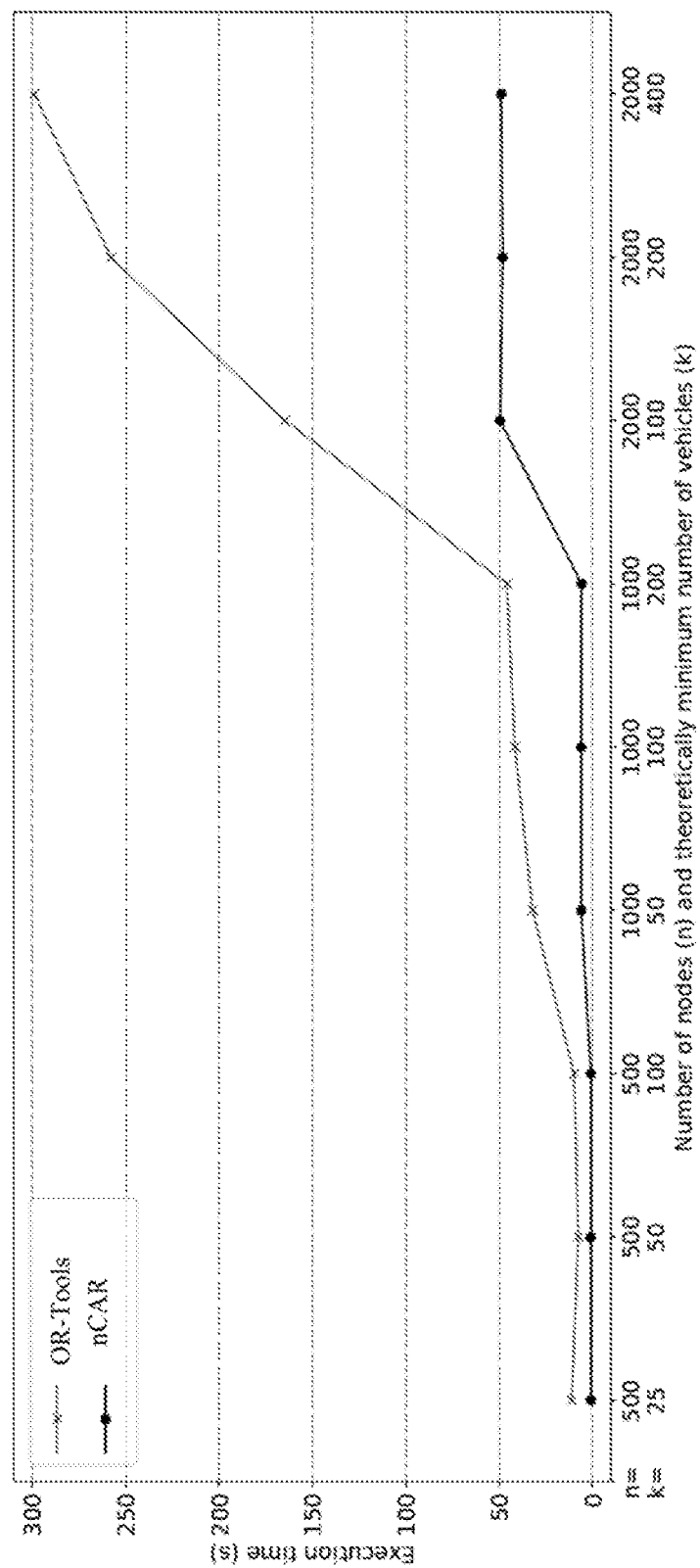
FIG. 8 provides a performance comparison in terms of execution time between Google™ optimization tools (OR-Tools) and the method of the present disclosure for a large number of nodes.
Figure 9:
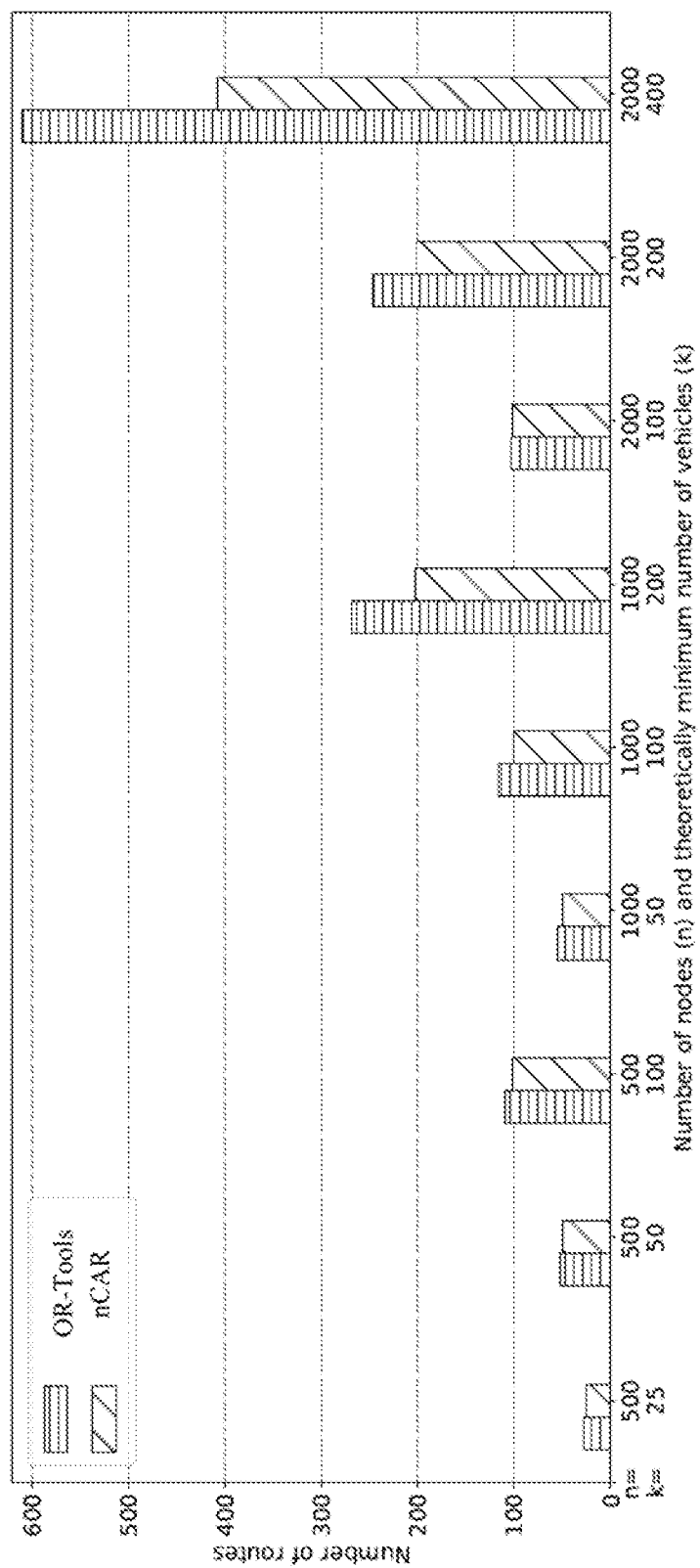
FIG. 9 provides a performance comparison in terms of number of routes between Google™ optimization tools (OR-Tools) and the method of the present disclosure for a large number of nodes.

FIG. 7 provides a cost comparison between Google™ optimization tools (OR-Tools) and the method of the present disclosure for a large number of nodes. From FIG. 7, it is evident that nCAR provides a low cost solution as the number of nodes increases. Moreover, OR-Tools require a significantly higher execution time to find a solution. FIG. 8 provides a performance comparison in terms of execution time between Google™ optimization tools (OR-Tools) and the method of the present disclosure for a large number of nodes. From FIG. 8 it is clear that the execution time increases many fold with the number of nodes in the CVRP instance. The effectiveness of nCAR magnifies, if the cost of the solution is measured in terms of make span to complete all the tasks. If there are r routes in the solution and there are r vehicles, all vehicles can be assigned one route each. The cost of the solution can be measured in terms of the maximum route length. Obviously, when there are more number of nodes, the solution also contains a significantly larger number of routes. Due to the limited number of vehicles, all the routes can not be visited in parallel. As a result, the assignment becomes time extended and a vehicle takes up a new route after completing the previous route. In this case, the cost of the solution is the maximum amount of time among all the vehicles. Thus, the lesser the number of routes, the better it is. FIG. 9 provides a performance comparison in terms of number of routes between Google™ optimization tools (OR-Tools) and the method of the present disclosure for a large number of nodes.

A multi-robot task allocation (MRTA) method has been explained above specifically referring to a warehouse scenario, where a task is defined as picking up an object from its respective storage rack. Though a robot can pick multiple objects on a single run, the number of objects is constrained by its capacity. This problem may be reduced to the CVRP problem. Since CVRP is known to be NP-hard, this problem is also NP-hard. The state-of-the-art integer programming based optimal methods solve CVRP instances up to 100 nodes. However, in a warehouse scenario, the number of nodes can be in the range of several hundreds to several thousands within an order wave. Thus, systems and methods of the present disclosure provide a $O(n^3)$ heuristic approach, called nCAR that can provide a reasonably good result even if there are a large number of nodes. Experimental results show that the present disclosure provides solutions that are close to the optimal solutions for smaller instances (cost ratio up to 1.6). For CVRPs with large number of nodes, where optimal solution is not available, nCAR has been compared with the state-of-the-art approximation method provided by the Google™ Optimization Toolbox (OR-Tools). The evaluation shows that nCAR achieves a superior result as compared to the OR-Tools in terms of the cost of the solution, the number of routes and the actual execution time of the algorithm.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor implemented method (200) comprising:
obtaining input parameters comprising: a number of nodes representative of tasks to be allocated to one or more vehicles, distances between each of the number of nodes as a metric that satisfies triangle inequality, demands associated with each of the number of nodes representative of a quantity associated with the tasks, and maximum capacities of each of the one or more vehicles representative of a weight carrying capacity of the one or more vehicles, wherein each of the one or more vehicles fetch multiple objects on a single run such that the total weight of the tasks is within the maximum capacity of the each vehicle;
determining a plurality of clusters of the number of nodes based on a heuristic nearest neighbor node based Clustering and Routing (nCAR) approach such that each of the plurality of clusters forms a feasible route for an associated vehicle meeting criteria of a total demand associated with each of the plurality of clusters is within the maximum capacity of the associated vehicle; and the plurality of clusters leads to a lowest total cost, wherein the lowest total cost is representative of a total length travelled by the one or more vehicles to complete all the tasks, wherein the heuristic nCAR approach creates a subset of cluster combination by splitting all the tasks which results in a low cost solution and achieves scalability, wherein the subset comprises a plurality of clusters of disjoint sets of nodes except for a depot node representative of a node where a cluster starts and ends; and determining an optimum route within each of the plurality of clusters such that the total length travelled by the associated vehicle is minimized, wherein a number of clusters comprising the plurality of nodes determine a number of vehicles required to complete all the tasks, wherein when the number of vehicles is less than a number of routes, then the vehicle from the number of vehicles starts a new route after completing a previously assigned route;

wherein, based on the determining of the optimum route within each of the plurality of clusters, the vehicle from the number of vehicles completes one optimum route within one of the plurality of clusters.

2. The processor implemented method of claim 1, wherein the heuristic nCAR approach comprises:

(i) creating potential clusters for n number of the nodes, the n number of nodes being initially unassigned to any of the plurality of clusters, the step of creating n potential clusters comprises: iteratively performing for each of the n number of nodes:

initializing a demand of an $i^{th}$ potential cluster to a demand of an $i^{th}$ node;

identifying the $i^{th}$ node as a current node;

iteratively determining a nearest neighbor node of the current node based on a Euclidean distance between the current node and the nearest neighbor node;

selecting the nearest neighbor node as a cluster member and identifying the nearest neighbor node as a new current node if a capacity restriction is satisfied, wherein a sum of the demand of the $i^{th}$ potential cluster and a demand of the nearest neighbor node representing a total demand is within the maximum capacity of the associated vehicle to form the feasible route; and (ii) selecting a best cluster from the n potential clusters by:

computing cost of an Euler cycle and a single node cycle cost associated with the number of nodes of the n potential clusters and assigning a summation thereof as total cost for each of the n potential clusters;

selecting a potential cluster associated with a lowest cluster total cost as the best cluster; and assigning the number of nodes of the best cluster to a group T and remaining number of nodes of then number of nodes to a group T̄;

(iii) repeating steps (i) and (ii) until the group T̄ is empty;

wherein the best cluster from each iteration constitutes the plurality of nodes that form the feasible route for the associated vehicle such that a total path cost of a list of routes is minimized.

3. A system comprising:

one or more data storage devices operatively coupled to one or more hardware processors and configured to store instructions configured for execution by the one or more hardware processors to:

obtain input parameters comprising: a number of nodes representative of tasks to be allocated to one or more vehicles, distances between each of the number of nodes as a metric that satisfies triangle inequality, demands associated with each of the number of nodes representative of a quantity associated with the tasks, and maximum capacities of each of the one or more vehicles representative of a weight carrying capacity of the one or more vehicles, wherein each of the one or more vehicles fetch multiple objects on a single run such that the total weight of the tasks is within the maximum capacity of the each vehicle;

determine a plurality of clusters of the number of nodes based on a heuristic nearest neighbor node based Clustering and Routing (nCAR) approach such that each of the plurality of clusters forms a feasible route for an associated vehicle meeting criteria of a total demand associated with each of the plurality of clusters is within the maximum capacity of the associated vehicle; and the plurality of clusters leads to a lowest total cost, wherein the lowest total cost is representative of a total length travelled by the one or more vehicles to complete all the tasks, wherein the heuristic nCAR approach creates a subset of cluster combination by splitting all the tasks which results in a low cost solution and achieves scalability, wherein the subset comprises a plurality of clusters of disjoint sets of nodes except for a depot node representative of a node where a cluster starts and ends; and determine an optimum route within each of the plurality of clusters such that the total length travelled by the associated vehicle is minimized, wherein a number of clusters comprising the plurality of nodes determine a number of vehicles required to complete all the tasks, wherein when the number of vehicles is less than a number of routes, then the vehicle from the number of vehicles starts a new route after completing a previously assigned route;

wherein, based on the determining of the optimum route within each of the plurality of clusters, the vehicle from the number of vehicles completes one optimum route within one of the plurality of clusters.

4. The system of claim 3, wherein the one or more hardware processors are further configured to determine a plurality of clusters of the nodes based on the heuristic nCAR approach by:

(i) creating n potential clusters for n number of the nodes, the n number of nodes being initially unassigned to any of the plurality of clusters, the step of creating n potential clusters comprises: iteratively performing for each of the n number of nodes:

initializing a demand of an $i^{th}$ potential cluster to a demand of an $i^{th}$ node;

identifying the $i^{th}$ node as a current node;

iteratively determining a nearest neighbor node of the current node based on a Euclidean distance between the current node and the nearest neighbor node;

selecting the nearest neighbor node as a cluster member and identifying the nearest neighbor node as a new current node if a capacity restriction is satisfied, wherein a sum of the demand of the $i^{th}$ potential cluster and a demand of the nearest neighbor node representing a total demand is within the maximum capacity of the associated vehicle to form the feasible route; and (ii) selecting a best cluster from the n potential clusters by:

computing cost of an Euler cycle and a single node cycle cost associated with the number of nodes of the potential clusters and assigning a summation thereof as total cost for each of the n potential clusters;

selecting a potential cluster associated with a lowest cluster total cost as the best cluster; and assigning the number of nodes of the best cluster to a group T and remaining number of nodes of the n number of nodes to a group T̄;

(iii) repeating steps (i) and (ii) until the group T is empty;
wherein the best cluster from each iteration constitutes the plurality of nodes that form the feasible route for the associated vehicle such that a total path cost of a list of routes is minimized.

5. A computer program product comprising a non-transitory computer readable medium having a computer readable program embodied therein, wherein the computer readable program, when executed on a computing device, causes the computing device to:

obtain input parameters comprising: a number of nodes representative of tasks to be allocated to one or more vehicles, distances between each of the number of nodes as a metric that satisfies triangle inequality, demands associated with each of the number of nodes representative of a quantity associated with the tasks, and maximum capacities of each of the one or more vehicles representative of a weight carrying capacity of the one or more vehicles, wherein each of the one or more vehicles fetch multiple objects on a single run such that the total weight of the tasks is within the maximum capacity of the each vehicle;

determine a plurality of clusters of the number of nodes based on a heuristic nearest neighbor node based Clustering and Routing (nCAR) approach such that each of the plurality of clusters forms a feasible route for an associated vehicle meeting criteria of a total demand associated with each of the plurality of clusters is within the maximum capacity of the associated vehicle; and the plurality of clusters leads to a lowest total cost, wherein the lowest total cost is representative of a total length travelled by the one or more vehicles to complete all the tasks, wherein the heuristic nCAR approach creates a subset of cluster combination by splitting all the tasks which results in a low cost solution and achieves scalability, wherein the subset comprises a plurality of clusters of disjoint sets of nodes except for a depot node representative of a node where a cluster starts and ends; and determine an optimum route within each of the plurality of clusters such that the total length travelled by the associated vehicle is minimized, wherein a number of clusters comprising the plurality of nodes determine a number of vehicles required to complete all the tasks, wherein when the number of vehicles is less than a number of routes, then the vehicle from the number of vehicles starts a new route after completing a previously assigned route;

wherein, based on the determining of the optimum route within each of the plurality of clusters, the vehicle from the number of vehicles completes one optimum route within one of the plurality of clusters.

6. The computer program product of claim 5, wherein the computer readable program further causes the computing device to determine a plurality of clusters of the nodes based on the heuristic nCAR approach by:

(i) creating n potential clusters for n number of the nodes, the n number of nodes being initially unassigned to any of the plurality of clusters, the step of creating n potential clusters comprises: iteratively performing for each of the n number of nodes:

initializing a demand of an $i^{th}$ potential cluster to a demand of an $i^{th}$ node;

identifying the $i^{th}$ node as a current node;

iteratively determining a nearest neighbor node of the current node based on Euclidean distance between the current node and the nearest neighbor node;

selecting the nearest neighbor node as a cluster member and identifying the nearest neighbor node as a new current node if a capacity restriction is satisfied, wherein a sum of the demand of the $i^{th}$ potential cluster and a demand of the nearest neighbor node representing a total demand is within the maximum capacity of the associated vehicle to form the feasible route; and (ii) selecting a best cluster from the n potential clusters by:

computing cost of an Euler cycle and a single node cycle cost associated with the number of nodes of the n potential clusters and assigning a summation thereof as total cost for each of the n potential clusters;

selecting a potential cluster associated with a lowest cluster total cost as the best cluster; and assigning the number of nodes of the best cluster to a group T and remaining number of nodes of then number of nodes to a group T;

(iii) repeating steps (i) and (ii) until the group T is empty;
wherein the best cluster from each iteration constitutes the plurality of nodes that form the feasible route for the associated vehicle such that a total path cost of a list of routes is minimized.

* * * * *